United States Patent [19]

Bolton

[11] Patent Number: 5,768,433
[45] Date of Patent: Jun. 16, 1998

[54] PICTURE COMPRESSION CIRCUIT

[75] Inventor: Martin Bolton, Tullins, France

[73] Assignee: SGS-Thomson Microelectronics S.A., Saint Genis, France

[21] Appl. No.: 408,520

[22] Filed: Mar. 21, 1995

[30] Foreign Application Priority Data

Mar. 30, 1994 [FR] France .................................. 94 04144

[51] Int. Cl.$^6$ ........................................................ G06K 9/00
[52] U.S. Cl. ........................................... 382/238; 382/250
[58] Field of Search ........................................ 382/232, 233, 382/234, 235, 236, 238, 239, 241, 242, 243, 244, 245, 248, 250, 251, 253, 240, 246, 252; 348/416, 699, 409, 412, 415, 384

[56] References Cited

U.S. PATENT DOCUMENTS

| | | | |
|---|---|---|---|
| 5,122,875 | 6/1992 | Raychaudhuri et al. | 358/133 |
| 5,185,819 | 2/1993 | Ng et al. | 382/56 |
| 5,227,878 | 7/1993 | Puri et al. | 358/136 |
| 5,267,037 | 11/1993 | Sugiyama | 358/136 |

FOREIGN PATENT DOCUMENTS

| | | | |
|---|---|---|---|
| A-0456394A2 | 11/1991 | European Pat. Off. | G09G 1/16 |
| A-0508351A2 | 10/1992 | European Pat. Off. | H04N 7/137 |

OTHER PUBLICATIONS

Elektronik, vol. 41, No. 9, Nov. 1992, Munchen, DE, pp. 72–75, XP320229, M. Querol "MPEG/H261–Videodecoder Mit Wenigen Chips".

Electronics Engineering, vol. 6, No. 790, Oct. 1992, Woolwich, GB, pp. 77–82, XP320428 "Technology Focus: System Solutions For MPEG Imaging".

Electrical Design News, vol. 37, No. 15, Jul. 20, 1992, Newton, MA, p. 71, XP307545, G. Legg "MPEG Video–Decoder Chips Target Low–Cost Applications".

*Primary Examiner*—Leo Boudreau
*Assistant Examiner*—Bijan Tadayon
*Attorney, Agent, or Firm*—Wolf, Greenfield & Sacks, P.C.; James H. Morris; Richard F. Giunta

[57] ABSTRACT

A picture compression circuit includes a video memory and an encoding unit connected to the video memory in order to read a picture by macroblocks to subject these macroblocks to a discrete cosine transform, a quantification and a variable length coding, and to read in the memory predictor macroblocks of another picture and to subtract these predictor macroblocks from the currently processed macroblocks. A motion estimation unit can be connected to the video bus and to the encoding unit, to receive through the video bus a macroblock currently processed and a search window, in order to search in the window for a predictor macroblock. The difference of position between the predictor macroblock and the currently processed macroblock is provided as a motion estimation vector to the encoding unit.

73 Claims, 5 Drawing Sheets

PICTURE COMPRESSION CIRCUIT

BACKGROUND OF THE INVENTION

1. Field of the Invention

The present invention relates to motion picture compression circuits for pictures such as television pictures, and more particularly to a compression circuit complying with H.261 and MPEG standards.

2. Discussion of the Related Art

FIGS. 1A–1C schematically illustrate three methods for compressing motion pictures in accordance with H.261 and MPEG standards. According to H.261 standards, pictures may be of intra or predicted type. According to MPEG standards, the pictures can also be of bidirectional type.

Intra pictures are not coded with reference to any other pictures. Predicted pictures are coded with reference to a past intra or past predicted picture. Bidirectional pictures are coded with reference to both a past picture and a following picture.

FIG. 1A illustrates the compression of an intra picture I1. Picture I1 is stored in a memory area M1 before being processed. The pictures have to be initially stored in a memory since they arrive line by line whereas they are processed square by square, the size of each square being generally 16×16 pixels. Thus, before starting to process picture I1, memory area M1 must be filled with at least 16 lines.

The pixels of a 16×16-pixel square are arranged in a so-called "macroblock". A macroblock includes four 8×8 pixel luminance blocks and two or four 8×8-pixel chrominance blocks. The processes hereinafter described are carried out by blocks of 8×8 pixels.

The blocks of each macroblock of picture I1 are submitted at 10 to a discrete cosine transform (DCT) followed at 11 by a quantification. A DCT transforms a matrix of pixels (a block) into a matrix whose upper left corner coefficient has a high value. The other coefficients rapidly decrease as they depart from the upper left corner. The quantification essentially consists in dividing the coefficients of the matrix so transformed, whereby a large number of coefficients which are a distance away from the upper left corner are cancelled.

At 12, the quantified matrices are subject to zigzag scanning (ZZ) and to run/level coding (RLC). The zigzag scanning has the consequence of providing consecutive series of zero coefficients, each of which is preceded by a non-zero coefficient. The run/level coding mainly includes replacing each series from the ZZ scanning with a pair of values, one representing the number of successive zero coefficients and the other representing the first following non-zero coefficient.

At 13, the pairs of values from the RLC are subject to variable length coding (VLC) that includes replacing the more frequent pairs with short codes and replacing the less frequent pairs with long codes, with the aid of correspondence tables defined by the H.261 and MPEG standards. The quantification coefficients used at 11 that can vary from one block to the other, are inserted during variable length coding in headers preceding the compressed data corresponding to macroblocks.

Macroblocks of an intra picture are mostly used to compress macroblocks of a subsequent picture of predicted or bidirectional type. Thus, decoding of a predicted or bidirectional picture is likely to be achieved from a previously decoded intra picture. This previously decoded intra picture does not exactly correspond to the actual picture initially received by the compression circuit, since this initial picture is altered by the quantification at 11. Thus, the compression of a predicted or intra picture is carried out from a reconstructed intra picture I1r rather than from the real intra picture I1, so that decoding is carried out under the same conditions as encoding.

The reconstructed intra picture I1r is stored in a memory area M2 and is obtained by subjecting the macroblocks provided by the quantification 11 to a reverse processing, that is, at 15 an inverse quantification followed at 16 by an inverse DCT.

FIG. 1B illustrates the compression of a predicted picture P4. The predicted picture P4 is stored in a memory area M1. A previously processed intra picture I1r has been reconstructed in a memory area M2.

The processing of the macroblocks of the predicted picture P4 is carried out from so-called predictor macroblocks of the reconstructed picture I1r. Each macroblock of picture P4 (reference macroblock) is subject at 17 to motion estimation (generally, the motion estimation is carried out only with the four luminance blocks of the reference macroblocks). This motion estimation includes searching in a window of picture I1r for a macroblock that is nearest, or most similar to the reference macroblock. The nearest macroblock found in the window is the predictor macroblock. Its position is determined by a motion vector V provided by the motion estimation. The predictor macroblock is subtracted at 18 from the current reference macroblock. The resulting difference macroblock is subjected to the process described with relation to FIG. 1A.

Like the intra pictures, the predicted pictures serve to compress other predicted pictures and bidirectional pictures. For this purpose, the predicted picture P4 is reconstructed in a memory area M3 by an inverse quantification at 15, inverse DCT at 19, and addition at 19 of the predictor macroblock that was subtracted at 18.

The vector V provided by the motion estimation 17 is inserted in a header preceding the data provided by the variable length coding of the currently processed macroblock.

FIG. 1C illustrates the compression of a bidirectional picture B2. Bidirectional pictures are provided for in MPEG standards only. The processing of the bidirectional pictures differs from the processing of predicted pictures in that the motion estimation 17 consists in finding two predictor macroblocks in two pictures I1r and P4r, respectively, that were previously reconstructed in memory areas M2 and M3. Pictures I1r and P4r generally respectively correspond to a picture preceding the bidirectional picture that is currently processed and to a picture following the bidirectional picture.

At 20, the mean value of the two obtained predictor macroblocks is calculated and is subtracted at 18 from the currently processed macroblock.

The bidirectional picture is not reconstructed because it is not used to compress another picture.

The motion estimation 17 provides two vectors V1 and V2 indicating the respective positions of the two predictor macroblocks in pictures I1r and P4r with respect to the reference macroblock of the bidirectional picture. Vectors V1 and V2 are inserted in a header preceding the data provided by the variable length coding of the currently processed macroblock.

In a predicted picture, an attempt is made to find a predictor macroblock for each reference macroblock.

However, in some cases, using the predictor macroblock that is found may provide a smaller compression rate than that obtained by using an unmoved predictor macroblock (zero motion vector), or even smaller than the simple intra processing of the reference macroblock. Thus, depending upon these cases, the reference macroblock is submitted to either predicted processing with the vector that is found, predicted processing with a zero vector, or intra processing.

In a bidirectional picture, an attempt is made to find two predictor macroblocks for each reference macroblock. For each of the two predictor macroblocks, the process providing the best compression rate is determined, as indicated above with respect to a predicted picture. Thus, depending on the result, the reference macroblock is submitted to either bidirectional processing with the two vectors, predicted processing with only one of the vectors, or intra processing.

Thus, a predicted picture and a bidirectional picture may contain macroblocks of different types. The type of a macroblock is also data inserted in a header during variable length coding. According to MPEG standards, the motion vectors can be defined with an accuracy of half a pixel. To search a predictor macroblock with a non integer vector, first the predictor macroblock determined by the integer part of this vector is fetched, then this macroblock is submitted to so-called "half-pixel filtering", which includes averaging the macroblock and the same macroblock shifted down and/or to the right by one pixel, depending on the integer or non-integer values of the two components of the vector. According to H.261 standards, the predictor macroblocks may be subjected to low-pass filtering. For this purpose, information is provided with the vector, indicating whether filtering has to be carried out or not.

The succession of types (intra, predicted, bidirectional) is assigned to the pictures in a predetermined way, in a so-called group of pictures (GOP). A GOP generally begins with an intra picture. It is usual, in a GOP, to have a periodical series, starting from the second picture, including several successive bidirectional pictures, followed by a predicted picture, for example of the form IBBPBBPBB.. where I is an intra picture, B a bidirectional picture, and P a predicted picture. The processing of each bidirectional picture B is carried out from macroblocks of the previous intra or predicted picture and from macroblocks of the next predicted picture.

The number of memory areas M that are needed to process a GOP as described above is equal to 3 plus the maximum number of successive bidirectional pictures in the GOP. In the above example, five memory areas M are needed.

FIG. 2 exemplifies the use of five memory areas M1 to M5 for a GOP that includes pictures I1 B2 B3 P4 B5 B6 P7 .. .. The compression processes are represented by full arrows, and the motion estimation processes are illustrated by dotted arrows.

Initially, the intra picture I1 is stored in a memory area M1. The intra picture I1 is reconstructed (I1r) in a memory area M2 and output in compressed form (I1c).

The next bidirectional picture B2 is written in memory area M1 over picture I1. Picture B2 cannot be processed yet because its processing utilizes macroblocks of picture P4 that have not arrived yet.

The bidirectional picture B3 is written in a memory area M3. Like picture B2, picture B3 cannot be processed yet.

The predicted picture P4 is written in a memory area M4. Picture P4 is processed using the reconstructed intra picture I1r of area M2. Picture P4 is output in compressed from (P4c) and is reconstructed (P4r) in an area M5.

The bidirectional picture B5 is written in memory area M4 over picture P4. The bidirectional picture B2, stored in area M1, can then be processed using the reconstructed pictures I1r and P4r and be output in compressed form (B2c).

The bidirectional picture B6 is written in area M1 over the bidirectional picture B2. The bidirectional picture B3 in area M3 is processed using the reconstructed pictures I1R and P4r and is output in compressed form (B3c).

The predicted picture P7 is written in area M3 over picture B3. Picture P7 is processed using the reconstructed picture P4r in area M5. Picture P7 is output in compressed form and reconstructed (P7r) in area M2 over picture I1r.

SUMMARY OF THE INVENTION

An object of the present invention is to provide a picture compression circuit having an architecture that can be easily adapted to different uses of H.261 and MPEG standards.

To achieve this and other objects of the invention, one illustrative embodiment of the present invention provides a picture compression circuit including a video memory capable of storing a predetermined number of pictures, the cells of this memory being sequentially accessible through a video bus and randomly accessible through a memory bus; an encoding unit, connected to the video memory through the memory bus, to store in the memory a picture received at an input, to read a picture by macroblocks to subject these macroblocks to a discrete cosine transform, a quantification and a variable length coding, and to read in the memory predictor macroblocks of another picture and to subtract these predictor macroblocks from the currently processed macroblocks; and a motion estimation unit that can be connected to the video bus and to the encoding unit, to receive through the video bus a macroblock currently processed by the encoding unit and a window surrounding this macroblock in another picture, in order to search in the window a predictor macroblock that is the nearest possible to the currently processed macroblock, the difference of position between the predictor macroblock and the currently processed macroblock being provided as a motion estimation vector to the encoding unit to indicate the position of the predictor macroblock in the memory.

According to another embodiment of the invention, the encoding unit receives a picture synchronization signal and is connected to a microprocessor, that may be interrupted by the encoding unit at each arrival of a picture indicated by the synchronization signal, the microprocessor being programmed to respond to each interrupt by providing the encoding unit with data indicating the memory areas which contain the currently received picture, the currently processed picture and the picture where predictor macroblocks are searched for, and indicating the beginning of encoding of a new picture.

According to a further embodiment of the invention, the microprocessor is programmed to respond to the interrupts of the encoding unit by providing it with the type of the picture to process.

According to a further embodiment of the invention, the motion estimation unit provides the encoding unit with a decision indicating whether the currently processed macroblock is to be processed by subtracting a predictor macroblock and whether the motion vector is to be used.

According to a still further embodiment of the invention, the motion estimation unit is connected to the microprocessor in order to receive therefrom criteria that establish the conditions under which the decision of how to process the current macroblock is provided by the motion estimation unit to the encoding unit.

The foregoing and other objects, features, aspects and advantages of the invention will become apparent from the following detailed description of the present invention when taken in conjunction with the accompanying drawings.

DETAILED DESCRIPTION

Figure 3:
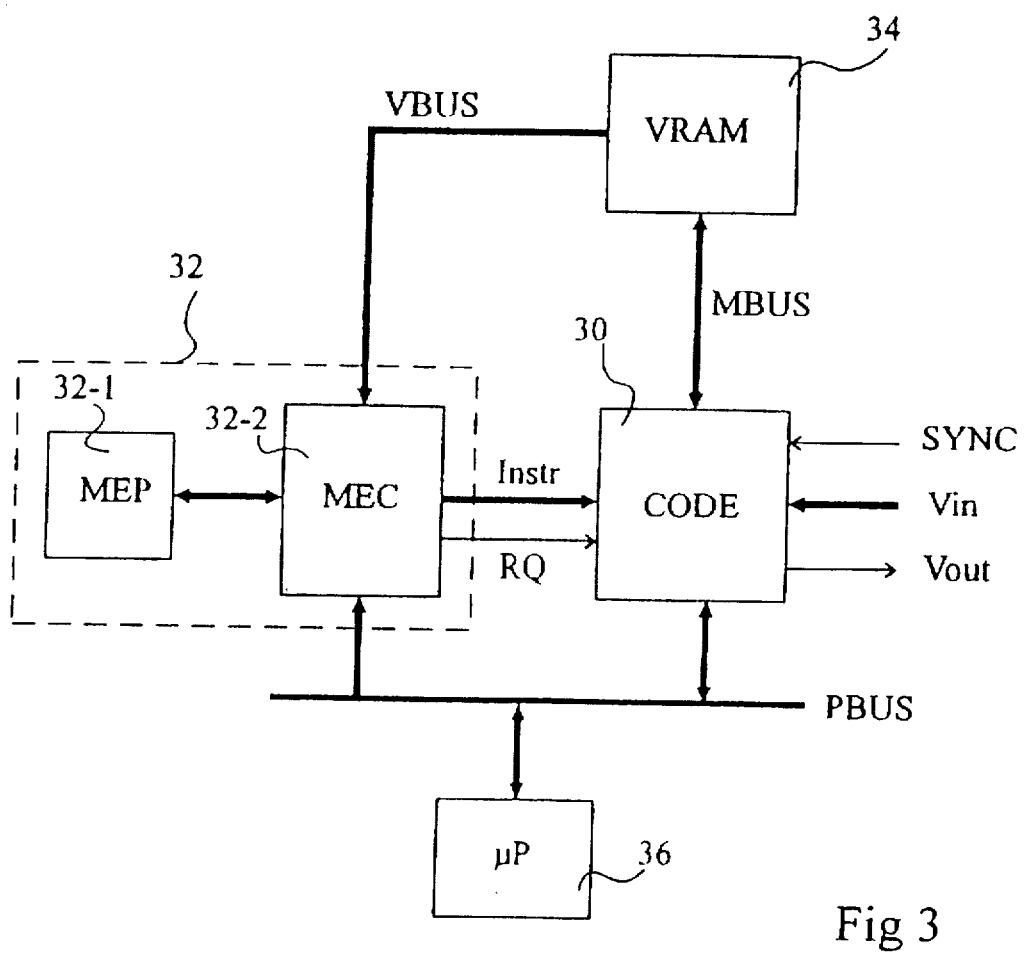
FIG. 3 represents an architecture of a picture compression circuit according to the invention.

The circuit of FIG. 3, representing an illustrative embodiment of the invention, includes an encoding unit 30 receiving instructions from a motion estimation unit 32. A video memory 34 is connected to the encoding unit 30 through a memory bus MBUS and to the motion estimation unit 32 through a video bus VBUS.

A video memory is a dynamic memory whose cells are randomly accessible by bus MBUS and sequentially accessible by bus VBUS. As in conventional dynamic memories, the cells of a video memory are distributed in so-called pages. To access a cell through bus MBUS, the page containing this cell is first selected and then the cell itself is selected. When the video memory is accessed through bus VBUS, a starting address is selected; a page length of cells starting at this address is then available to be sequentially read by bus VBUS.

Figure 1B:
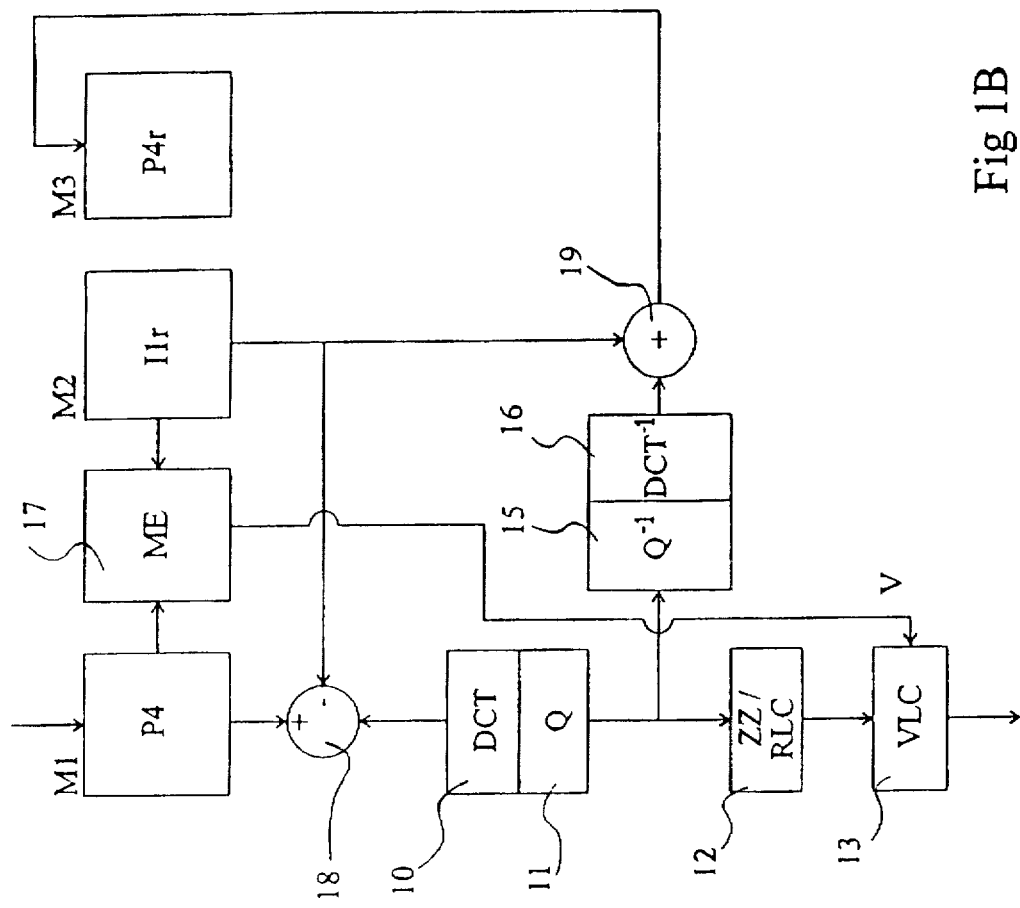
FIGS. 1A–1C, above described, illustrate three picture compression processes according to H.261 and MPEG standards.
Figure 1A:
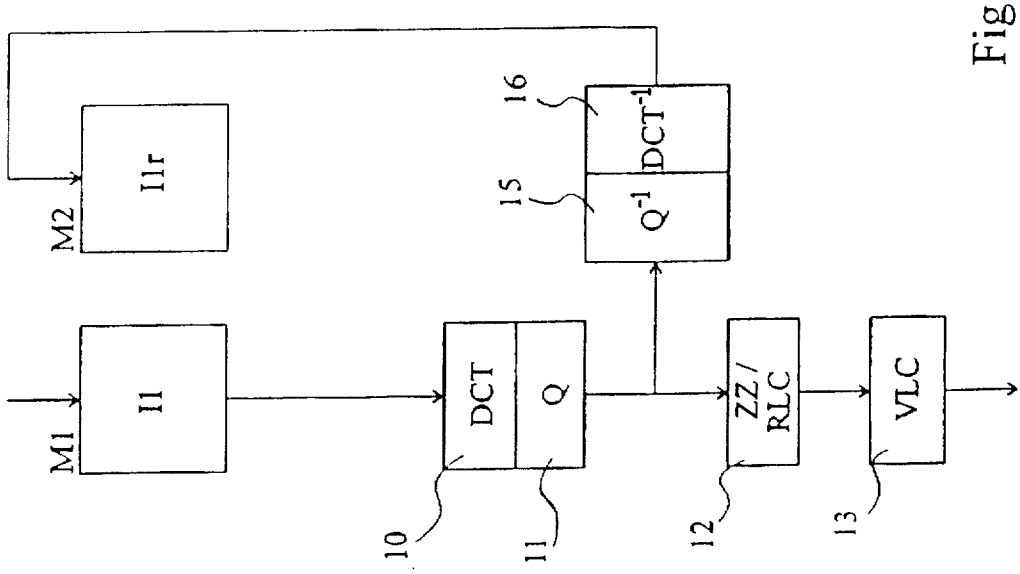

The encoding unit 30 manages the access to memory 34, through the two buses VBUS and MBUS, and carries out operations described with reference to FIGS. 1A–1C, except for the motion estimation 17. The encoding unit 30 receives the data to compress through a bus Vin, and picture synchronization signals SYNC, especially a vertical synchronization signal indicating each arrival of a new picture. Unit 30 provides the compressed pictures through a serial line Vout.

The motion estimation unit 32 receives from memory 34 each macroblock processed by the encoding unit 30, a reference macroblock, and a corresponding search window. When a motion estimation is completed, the motion estimation unit 32 provides the encoding unit 30 with an instruction. Each instruction contains one or more motion vectors allowing to fetch in memory 34 one or more predictor macroblocks to be used for encoding the reference macroblock. To comply with H.261 standards, the vectors may be provided with information indicating whether a low-pass filtering has to be carried out on the corresponding predictor macroblocks.

The encoding unit 30 is provided with information indicative of a processing decision indicating whether the reference macroblock is to be intra processed and whether the motion vector is to be used. For this purpose, the motion estimation unit 32 checks, among the predicted processing using the motion vector, both the predicted processing using a zero vector, and the intra processing, in order to determine which processing provides the best compression rate. The decision resulting from this checking is provided to the encoding unit 30 in the instruction.

Furthermore, a picture compression circuit may be used in a system that includes a microprocessor 36. The microprocessor 36 is, for example, connected to the picture compression circuit in order to store on a hard disk or a floppy disk the currently compressed pictures. According to one aspect of the present invention, the microprocessor 36 also executes some tasks of the picture compression, described hereafter, such as the management of the memory areas described with reference to FIG. 2. For this purpose, the encoding unit 30 is connected to a bus PBUS of the microprocessor 36.

The structure of FIG. 3 is easily adaptable to many different uses in accordance with H.261 and MPEG standards. The encoding unit 30 may be provided to meet all the requirements of the H.261 and MPEG standards for the compression of macroblocks with, if necessary, vectors indicating the positions of the predictor macroblocks. Thus, in one illustrative embodiment, the structure of the encoding unit 30 may be fixed. In contrast, the motion estimation unit 32 and the size of the video memory 34 may respectively vary as a function of the quality of compression required and the size of the processed pictures.

In some cases, when a high flow of compressed data or a lower quality of compression are tolerable, the motion estimation unit may be omitted. Then, all the pictures are intra or predicted with zero vector and the video memory 34 can be replaced with a simple dynamic memory. The possibility of choosing the intra type or the predicted type with zero vector may be determined by the microprocessor by setting a bit of the encoding unit 30.

In another illustrative embodiment, as represented in the figures, the motion estimation unit 32 includes a motion estimation processor 32-1, such as the circuit STi3220 fabricated by SGS-Thomson Microelectronics, and a motion estimation controller 32-2 used as an interface between the motion estimation processor 32-1 and the encoding unit 30. The application note of circuit STi3220 describes one manner in which a motion estimation controller 32-2 can be fabricated.

Advantageously, the motion estimation controller 32-2 includes a computing unit that processes the results provided by the motion estimation processor 32-1 to make the above mentioned decisions (i.e., whether the vector is used, whether the macroblock is intra . . . ). The operations carried out by such a unit are simple and those skilled in the art can realize them with comparators, adders and multipliers. An exemplary operation to make these decisions, using parameters selected by the user, is described in Model 3 of MPEG Video Simulation (SM3). As shown, the motion estimation controller 32-2 is connected to bus PBUS, thus allowing the microprocessor to write parameters in registers of the motion estimation controller, periodically or at power-on.

To process television pictures and high definition television pictures, several motion estimation processors of the STi3220-type may be used in parallel. The above application note also explains how to design an adapted motion estimation controller.

In all the above mentioned cases, the encoding unit 30 is still the same. The motion estimation unit 32 only provides the motion vectors and the processing decisions of the reference macroblock.

Figures 1C, 2:
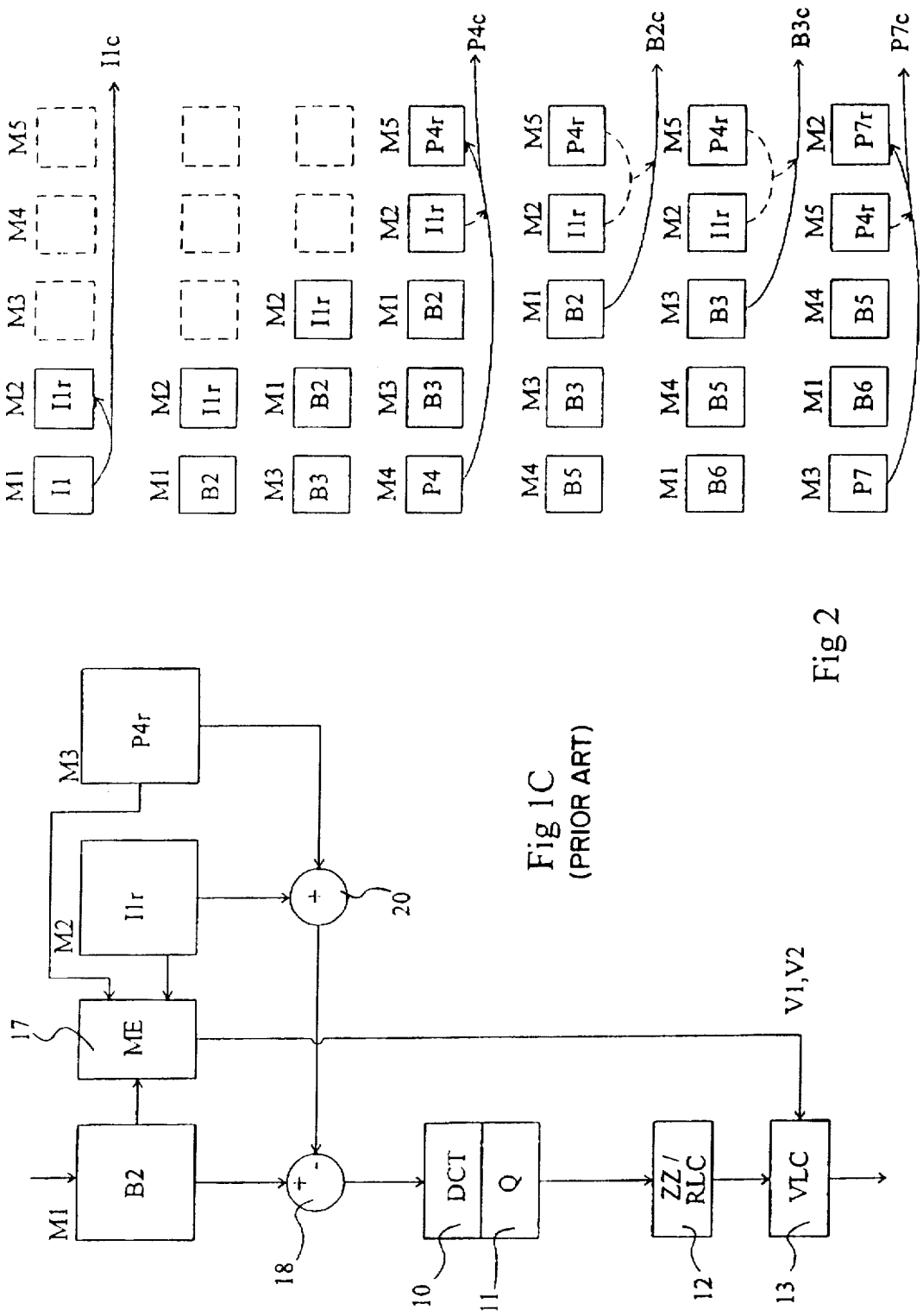
FIG. 2 illustrates managing memory areas during the compression of a sequence of pictures.
Figure 4A:
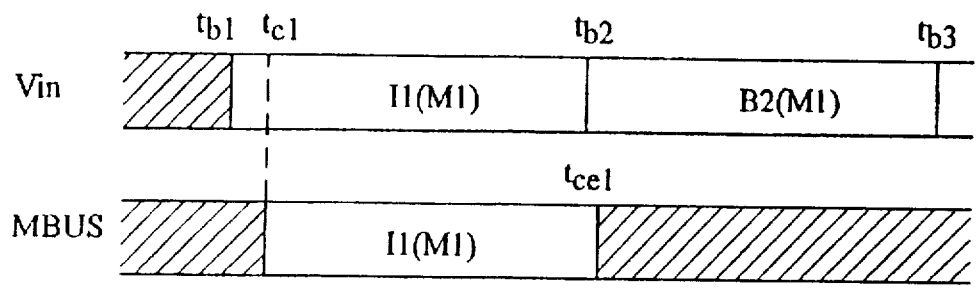
FIG. 4 illustrates the operation of the picture compression circuit of FIG. 3 during compression of an exemplary picture sequence.
Figure 4B:
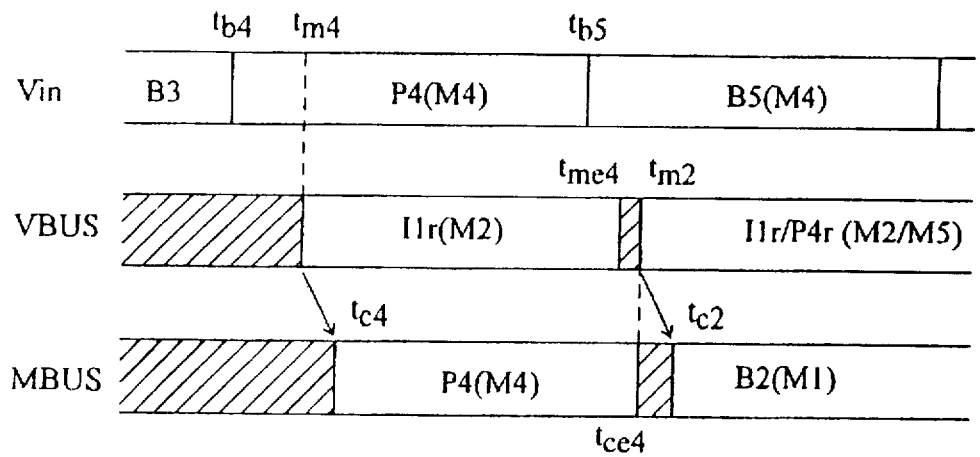
Figure 4C:
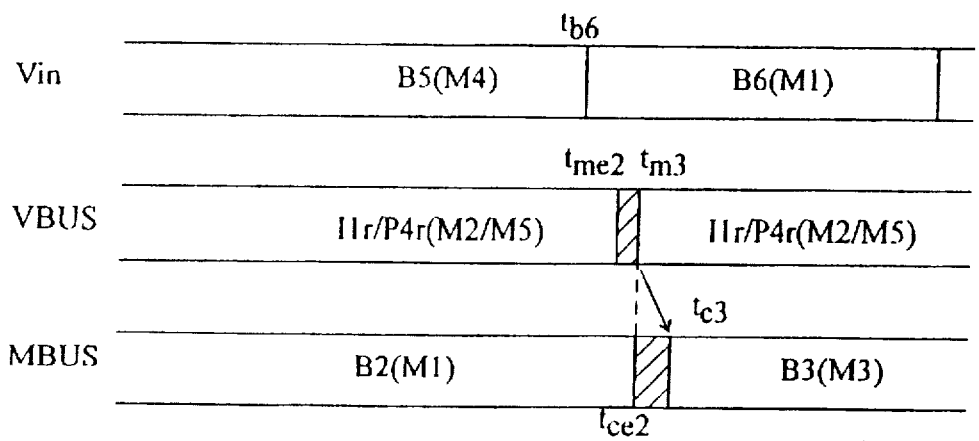

FIG. 4, which should be observed with FIG. 2, illustrates the operation of the compression circuit of FIG. 3 during processing of the exemplary group of pictures I1 B2 B3 P4 B5 B6 P7 .... FIG. 4 represents the activity on buses Vin, MBUS and VBUS. The activity on bus Vin corresponds to successive incoming pictures, the activity on bus MBUS corresponds to a succession of pictures to be processed by the encoding unit 30, and the activity on bus VBUS corresponds to the transfer of reference macroblocks and search windows from memory 34 to the motion estimation unit 32.

Times $t_b$, which may be determined by vertical synchronization pulses received by the encoding unit 30, indicate the beginning of each picture received on bus Vin. Times $t_c$ indicate the beginning of each processing of a picture by the encoding unit 30, and times $t_{ce}$ indicate the ends of these processings. Times $t_m$ indicate the beginning of the motion estimation of the first macroblock of each picture, and times $t_{me}$ indicate the end of the motion estimation of the last macroblock of each picture. Each of these times has an index indicating the arrival number of the corresponding picture.

At each time $t_b$, the microprocessor 36 is interrupted by the encoding unit 30. The microprocessor is programmed to respond to this interruption by transferring coding parameters in a register of the encoding unit 30.

These parameters may include the type (intra, predicted, bidirectional) of the picture to be processed, the memory areas M in which are respectively stored the currently received pictures, the picture to be encoded, the reconstructed picture, and one or more pictures in which the predictor macroblocks are searched. Thus, in this example, the task of the microprocessor 36 is more particularly to determine the type of group of pictures (IBBPBBPBB ...) and to control the assignment of the memory areas. These tasks, that are readily achieved by software, simplify the structure of the encoding unit 30 and increase the versatility of the compression circuit.

Furthermore, the microprocessor can provide as parameters a quantification table (particularly for MPEG standards) that is used in the quantification and the inverse quantification (which may be carried out by the encoding unit 30).

Once the microprocessor has provided these parameters, it enables the encoding unit 30 and, if necessary, the motion estimation unit 32, by setting respective bits of these units, to indicate that the encoding of a new picture can begin as soon as it is possible.

At time $t_{b1}$, the intra picture I1 begins to arrive. The parameters provided by the microprocessor indicate that picture I1 is an intra picture to be stored in area M1, and that it is the picture to encode. Since it is an intra picture, the motion estimation unit is not used (the motion estimation unit is not yet enabled by the microprocessor at this time in the example), so encoding can start as soon as area M1 contains the number of lines corresponding to the height of a macroblock.

At time $t_{c1}$, area M1 contains enough lines; encoding of picture I1 thus begins. Simultaneously, picture I1 is reconstructed in an area M2 (refer to FIG. 2).

At time $t_{ce1}$, the encoding of picture I1 is completed. Time $t_{ce1}$ is very likely to occur after time $t_{b2}$ indicating the beginning of the arrival of the next picture B2.

At time $t_{b2}$, the microprocessor indicates to the encoding unit 30 (in this example, this is before the end of the processing of picture I1) that picture B2 is stored in the same area M1 as picture I1. This can be done because the first macroblocks of picture B2 are written over the already processed macroblocks of picture I1.

The encoding duration of a picture can vary about the arrival duration of a picture, but the average encoding duration should normally be equal to or less than the arrival duration of a picture.

The bidirectional picture B2 is not yet encoded as long as the following predicted picture P4 has not been received. Therefore, the microprocessor does not provide, at time $t_{b2}$, any parameter to indicate the memory area of the picture to be encoded. The only activity on bus MBUS from time $t_{ce1}$ is the transfer into the memory of the incoming pictures (B2, B3).

At time $t_{b4}$, the predicted picture P4 begins to arrive after the bidirectional picture B3 has been received. The microprocessor indicates, among the parameters provided to the encoding unit 30, that picture P4 is predicted, that it is the picture to encode, and that the predictor macroblocks are to be fetched in area M2 (picture I1r). Then, the microprocessor enables the encoding unit 30 and the motion estimation unit 32. The motion estimation unit 32 sends a request to the encoding unit 30 for receiving through bus VBUS the reference macroblocks of picture P4, and the corresponding search windows of picture I1r. The encoding unit 30 waits until the memory contains enough lines of picture P4 to be able to transfer the first reference macroblock.

At time $t_{m4}$, the memory contains enough lines of picture P4. The encoding unit 30 sends to the motion estimation unit 32, through bus VBUS, the first macroblock of picture P4 and a corresponding search window of picture I1r.

At time $t_{c4}$, the motion estimation unit 32 has found a predictor macroblock in picture I1r and provides the corresponding motion vector to the encoding unit 30. The encoding unit 30 can then begin to process the first macroblock of picture P4 by using the vector for reading the predictor macroblock through bus MBUS (the address of the predictor macroblock may be calculated from the components of the vector).

In addition, the motion estimation unit 32 provides, in the instruction provided to the encoding unit 30, the above decision indicating that the reference macroblock is to be either processed as a predicted macroblock with the provided vector, processed as a predicted macroblock with a zero vector, or processed as an intra macroblock.

All the macroblocks of picture P4 are so processed until time $t_{me4}$ when the motion estimation is completed, and time $t_{ce4}$ when the encoding of picture P4 is completed.

At time $t_{b5}$, the reception of the bidirectional picture B5 begins. The microprocessor indicates to the encoding unit 30 that picture B5 is bidirectional, that it is stored in area M4 corresponding to the area of picture P4 that is still being encoded, and that the picture to encode is picture B2.

The motion estimation may be ended at time $t_{me4}$, after time $t_{b5}$, and the encoding of picture P4 may be ended shortly after time $t_{ce4}$. The duration of the motion estimation can vary about the arrival duration of a picture, but its average value is normally lower than or equal to this arrival duration.

At time $t_{m2}$, coinciding with time $t_{ce4}$ when the encoding of picture P4 has ended, the motion estimation of the first macroblock of picture B2 begins. The motion estimation can begin immediately after the end of the encoding of the preceding picture P4, because all the pictures needed (B2, I1r, P4r) are integrally available in the memory. The motion estimation unit 32 receives through bus VBUS the first reference macroblock of picture B2 as well as two corresponding search windows, of picture I1r and of picture P4r, respectively.

At time $t_{c2}$, the motion estimation unit finds a predictor macroblock in each of the two windows and provides two corresponding motion vectors to the encoding unit 30. Immediately, the encoding unit 30 processes the first macroblock of picture B2. The motion estimation unit 32 indicates to the encoding unit 30, for each of the two predictor macroblocks, that the provided vector or a zero vector must be used, or that the reference macroblock must be processed as an intra macroblock, depending on the solution that is likely to provide the best compression rate.

All the macroblocks of picture B2 are so processed until time $t_{me2}$ when the motion estimation is ended and time $t_{ce2}$ when the encoding of picture B2 is completed.

At time $t_{b6}$, which normally occurs before time $t_{me2}$, the arrival of the bidirectional picture B6 begins, and B6 is stored in area M1 where picture B2 was stored. The microprocessor indicates to the encoding unit 30 that the bidirectional picture B3 is the picture to encode. The bidirectional picture B3 is processed essentially in the same way as the bidirectional picture B2; the motion estimation begins at time $t_{m3}$ coinciding with time $t_{ce2}$ and encoding begins at time $t_{c3}$ shortly after time $t_{ce2}$.

Figure 5:
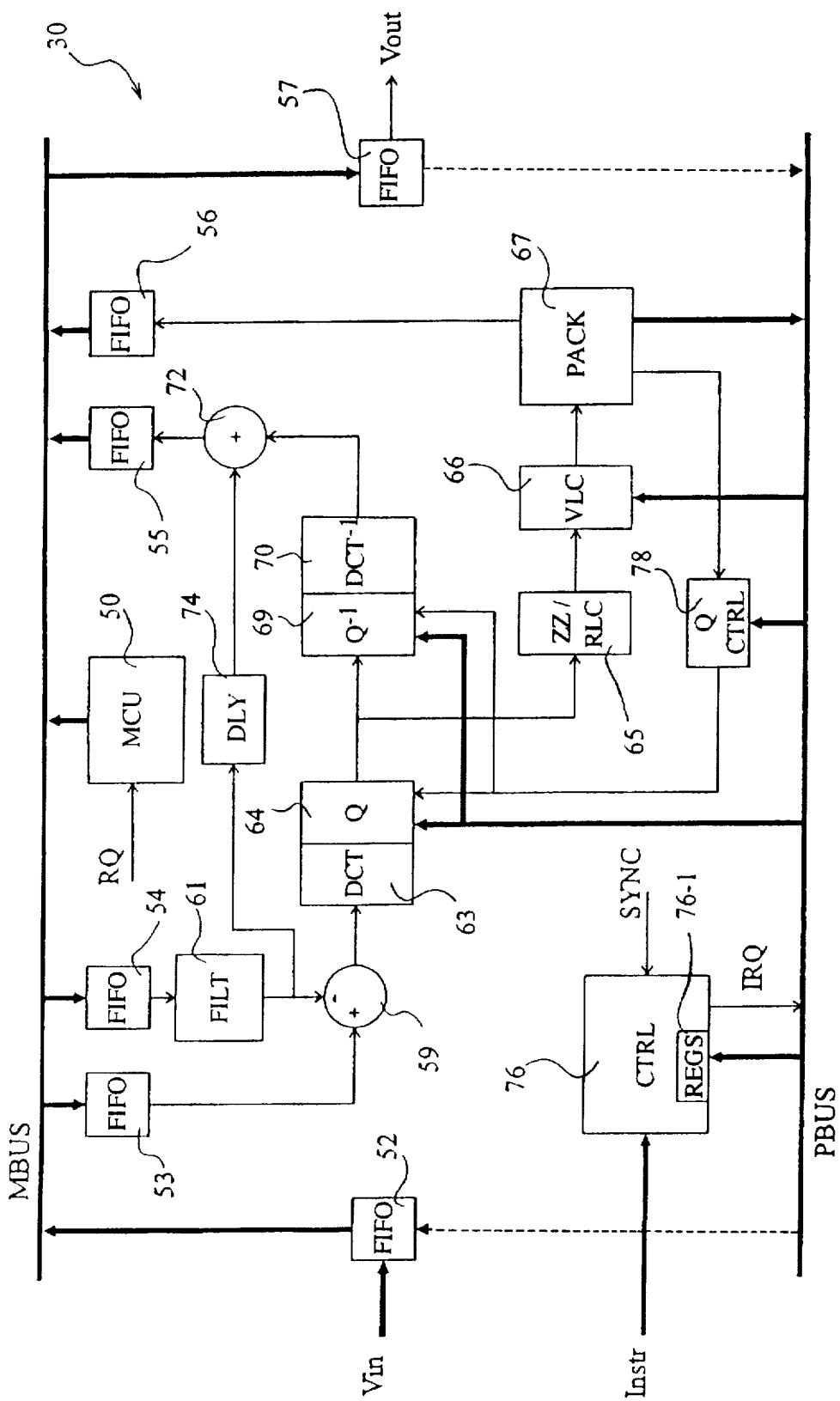
FIG. 5 represents an embodiment of an encoding unit of the picture compression circuit of FIG. 3.

FIG. 5 represents an embodiment of an encoding unit 30 according to the invention. The encoding unit includes a memory controller 50 which controls accesses to the video memory 34. In fact, the memory controller 50 may be a multi-task processor, wherein each task consists of a data transfer between the video memory 34 and an element of the compression circuit. More particularly, the memory controller 50 controls the transfers of data between the memory and various internal elements of the encoding unit 30. These internal elements are connected to bus MBUS through respective first-in/first-out (FIFO) buffers.

A FIFO 52 receives the data of the pictures to compress through bus Vin and provides this data on bus MBUS. A FIFO memory 53 receives through bus MBUS the successive macroblocks of the currently encoded picture. A FIFO 54 receives the predictor macroblocks through bus MBUS. A FIFO 55 provides on bus MBUS the reconstructed macroblocks. A FIFO 56 provides on bus MBUS the compressed data. Last, a FIFO 57 receives through bus MBUS the compressed data to serially provide them on line Vout.

The tasks to be executed by the memory controller 50 predominantly consist of transferring the data stored in FIFOs 52, 55 and 56 into corresponding areas of the memory 34, and in transferring into FIFOs 53, 54 and 57 the data corresponding to areas of memory 34. Each FIFO 52, 55 and 56 issues a request to the memory controller 50 as soon as its content is higher than a predetermined value, for example one half of its capacity. Each FIFO 53, 54 and 57 issues a request to the memory controller 50 as soon as its content is lower than a predetermined value, for example one half of its capacity. As mentioned above, the motion estimation unit 32 issues a request RQ when it needs to receive a reference macroblock and a corresponding search window. This request is provided to the memory controller 50 which also manages the transfer of data through bus VBUS from memory 34 to the motion estimation unit 32.

All these requests may be assigned with different priority levels, so as to ensure the handling through bus Vin of a continuous flow of data and the provision on line Vout of a continuous flow of bits.

A subtracter 59 receives the macroblocks to encode from FIFO 53 and the predictor macroblocks to subtract from FIFO 54 through a filter 61. The output of subtracter 59 is processed by a DCT circuit 63 and a quantification circuit 64. The output of the quantification circuit 64 is processed by a zigzag scanning and RLC circuit 65, a VLC circuit 66 and a packer circuit 67. The packer circuit 67 provides the compressed data.

The VLC circuit provides codes on a code bus. Since these codes may have variable lengths (1 to 16 bits, for example), the VLC circuit also provides the length of each code on a length bus. The role of the packer circuit 67 is to concatenate the successive codes by jumping the unused bits of the code bus.

As mentioned above, the VLC circuit receives information to be inserted in headers. This information is also submitted to variable length coding.

Each compressed macroblock is preceded by a header including, in particular, the macroblock type (intra, predicted or bidirectional, using a zero or non-zero vector), the motion vectors, the quantification coefficient, and the indication whether a predictor macroblock is filtered (H.261 standards).

A compressed picture is preceded by a header that includes the picture type.

For each picture slice, there is a header including the coordinates of the first macroblock of the slice to allow the decoder to recover in case information is lost.

Other headers may also be used, namely headers preceding groups of compressed pictures and headers preceding sequences of compressed pictures. The group headers include the type of succession of the pictures of the group, for example IBBPBBP . . . , as well as the frequency of the intra pictures in the group. The sequence headers may include quantification tables to use for intra or non-intra pictures and the picture size.

The information to constitute the macroblock and picture slice headers may be generated internally to the compression circuit and provided to the VLC circuit 66 which assigns codes of variable lengths to this information.

According to an aspect of the present invention, the picture headers, the group of picture headers, and the sequence headers are determined and encoded by the microprocessor and provided to the VLC circuit 66 through bus PBUS. This partition of the header generation tasks increases the flexibility of the system because the information in the picture headers, group of picture headers, and sequence headers may be modified as standards are modified. Thus, if a significant modification occurs, it will only be necessary to modify the microprocessor's program without modifying the compression circuit.

In this embodiment, an area of memory 64 is used as a buffer to ensure a continuous flow of bits on line Vout. For this purpose, the output of the packer circuit 67 is connected to bus MBUS through FIFO 56 in order to store the compressed data pending in memory 34, before providing them on line Vout through FIFO 57.

To carry out the reconstruction of the reference macroblocks, the output of the quantification circuit 64 is processed by an inverse quantification circuit 69 and an inverse DCT circuit 70. An adder 72 receives the output of circuit 70 and the output of filter 61 through a delay circuit 74. The delay circuit 74 introduces a delay corresponding to the delay of the data processing by circuits 63, 64, 69 and 70. The output of adder 72 corresponds to the reconstructed macroblocks that are provided on bus MBUS through FIFO 55.

The group of circuits 59-74 constitutes a so-called "pipeline" circuit.

A control circuit 76 of the encoding unit is connected to the microprocessor bus PBUS. Control circuit 76 includes the above mentioned registers 76-1 allowing the microprocessor to provide the encoding unit with various parameters such as the locations of the memory areas of the various pictures needed for encoding. Register 76-1 also includes a bit for enabling the encoding unit, which allows the microprocessor to initialize the encoding of a picture. The control circuit 76 receives the picture synchronization signals SYNC and issues an interruption request IRQ to the microprocessor each time a picture to compress is received. Control circuit 76 also receives the instructions provided by the motion estimation unit 32, providing the type of the reference macroblock, the corresponding motion vector and, for H.261 standards, a bit indicating whether the predictor macroblock determined by the vector has to be filtered. This bit enables or disables filter 61.

The locations (contained in registers 76-1) of the different pictures needed for coding, as well as the motion vectors, are provided to the memory controller 50 which can then calculate the addresses of the data to be transferred between memory 34 and the FIFO memories.

The quantification circuit 64 and the inverse quantification circuit 69 are connected to bus PBUS to receive from the microprocessor, according to MPEG standards, the quantification tables. Moreover, the quantification coefficients of circuits 64 and 69 are determined by a bit-rate control circuit 78 whose role is to adjust the quantification coefficient as a function of the difference between an obtained compression rate and an average desired compression rate. This difference is given by the packer circuit 67 which counts, for each macroblock, the number of bits provided by the VLC circuit 66.

An approach to adjust the quantification coefficient might include comparing the number of bits of each compressed macroblock with an average number of bits and, depending on the result, modifying the quantification coefficient for the next macroblock in order to decrease the difference or to obtain an average zero difference.

A more accurate approach, particularly easy to provide in an architecture according to the invention, includes carrying out the encoding of each picture in two passes. This encoding may be, for example, selected by the microprocessor which sets a dedicated bit of the control circuit 76.

In this example, during the first pass for encoding a picture, the macroblocks are not reconstructed and the packer circuit 67 does not provide any compressed data but counts the number of bits of each compressed macroblock and provides these numbers to the microprocessor. The microprocessor then uses these numbers to determine quantification correction coefficients to associate with each macroblock or group of macroblocks. Schematically, the quantification coefficient is increased when a compressed macroblock has a high number of bits, and is decreased when the compressed macroblock has a small number of bits. This approach provides a substantially constant quality and a substantially constant compression rate. These two results are not incompatible because the more complex is a picture, the more it can be quantified without visible degradation of the quality.

During the second pass, the quantification coefficient is multiplied at each macroblock or each group of macroblocks by the corresponding correction coefficient, which is provided by the microprocessor to the bit-rate control circuit 78.

As represented by dotted buses, FIFO 52 can receive data from bus PBUS, and FIFO 57 can provide data to bus PBUS. This allows the microprocessor both to provide pictures to be compressed and to receive compressed pictures.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A picture compression circuit comprising:

a video memory unit including a plurality of cells, an output port that provides sequential access to the plurality of cells, and an input/output port, distinct from the output port, that provides random access to the plurality of cells;

an encoding unit having an input that receives macroblocks of pictures to be compressed, and an input/output port that is coupled to the input/output port of the video memory, the encoding unit including circuitry that stores the macroblocks of a first picture in the video memory to create a first stored picture, and performs a discrete cosine transform, a quantification, and a variable length coding on the macroblocks of the first stored picture to generate a first compressed picture, the encoding unit further including circuitry that stores the macroblocks of a second picture in the video memory to create a second stored picture, and subtracts macroblocks of the second stored picture from macroblocks of the first stored picture, selected in accordance with a motion estimating vector, to generate a difference picture; and a motion estimation unit, coupled to the encoding unit and to the output port of the video memory, that receives a reference macroblock of the second picture, the reference macroblock having a position in the second picture, the motion estimation unit further receiving data representing a predictor window of the first picture, the predictor window including a plurality of macroblocks of the first picture that includes a macroblock having a position in the first picture that corresponds to the position of the reference macroblock in the second picture, the motion estimation unit including circuitry that searches the plurality of macroblocks in the predictor window to select a predictor macroblock in the first picture that is most similar to the reference macroblock in the second picture, the motion estimation unit further including circuitry that provides a motion estimating vector, indicative of a difference between the position of the reference macroblock in the second picture and a position of the predictor macroblock in the first picture, to the encoding unit.

2. The picture compression circuit of claim 1, wherein the encoding unit receives a picture synchronization signal indicating reception of each picture to be compressed, and wherein the picture compression circuit further includes a microprocessor, the encoding unit transmitting an interrupt to the microprocessor each time the picture synchronization signal indicates reception of a picture to be compressed, the microprocessor being programmed to respond to the interrupt by providing the encoding unit with data indicative of which cells within the video memory contain data representing a picture to be compressed by subtracting macroblocks of another picture, a picture containing macroblocks to be subtracted from the picture to be compressed, and a predictor window of the picture to be subtracted, the microprocessor further being programmed to respond to the interrupt by signalling the encoding unit to begin encoding of the picture whose reception caused the interrupt.

3. The picture compression circuit of claim 2, wherein the processor is further programmed to respond to the interrupt of the encoding unit by providing the encoding unit with information indicative of a type of the picture whose reception caused the interrupt.

4. The picture compression circuit of claim 1, wherein the motion estimation unit provides the encoding unit with at least one signal indicating whether each of the macroblocks is to be compressed by subtracting a macroblock of another picture, the at least one signal further indicating whether a motion estimating vector is to be used by the encoding unit for each of the macroblocks to be compressed.

5. The picture compression circuit of claim 4, further including a microprocessor, coupled to the motion estimation unit, that provides the motion estimation unit with a signal indicating criteria by which the motion estimation unit is to make the processing decision.

6. The picture compression circuit of claim 5, wherein the processing decision made by the motion estimation unit further is indicative of whether a zero motion estimating vector is to be used by the encoding unit in place of the motion estimating vector provided by the motion estimation unit.

7. The picture compression circuit of claim 6, wherein the picture compression circuit compresses the macroblocks of the pictures to be compressed in accordance with one of the H.261 standard and the MPEG standard.

8. The picture compression circuit of claim 4, wherein the processing decision made by the motion estimation unit is further indicative of whether a zero motion estimating vector is to be used by the encoding unit in place of the motion estimating vector provided by the motion estimation unit.

9. The picture compression circuit of claim 3, wherein types of the pictures to be compressed include an intra picture to be compressed without reference to any other picture, a predicted picture to be compressed with reference to one other picture, and a bidirectional picture to be compressed with reference to two other pictures.

10. The picture compression circuit of claim 9, wherein the motion estimation unit provides the encoding unit with at least one signal indicating whether each of the macroblocks is to be compressed by subtracting a macroblock of another picture, the at least one signal further indicating whether a motion estimating vector is to be used by the encoding unit for each of the macroblocks to be compressed.

11. The picture compression circuit of claim 10, wherein the processing decision made by the motion estimation unit is further indicative of whether a zero motion estimating vector is to be used by the encoding unit in place of the motion estimating vector provided by the motion estimation unit.

12. The picture compression circuit of claim 11, wherein the microprocessor is coupled to the motion estimation unit, the microprocessor providing the motion estimation unit with a signal indicating criteria by which the motion estimation unit is to make the processing decision.

13. The picture compression circuit of claim 12, wherein the picture compression circuit compresses the macroblocks of the pictures to be compressed in accordance with one of the H.261 standard and the MPEG standard.

14. The picture compression circuit of claim 1, wherein types of pictures to be compressed include an intra picture to be compressed without reference to any other picture, a predicted picture to be compressed with reference to one other picture, and a bidirectional picture to be compressed with reference to two other pictures.

15. The picture compression circuit of claim 1, wherein the picture compression circuit compresses the macroblocks of the pictures to be compressed in accordance with one of the H.261 standard and the MPEG standard.

16. An apparatus for processing pictures comprised of macroblocks, the pictures including an intra picture to be processed without reference to any other picture, a predicted picture to be processed with reference to one other picture, and a bidirectional picture to be processed with reference to two other pictures, the apparatus comprising:

first means for generating a predicted difference picture by subtracting data representing the intra picture from data representing the predicted picture, and for generating a bidirectional difference picture by subtracting a mathematical combination of data representing the predicted picture and data representing the intra picture from data representing the bidirectional picture;

storage means, coupled to the first means, for storing data generated by the first means including at least some of the data representing the intra picture and at least some of the data representing the predicted picture received through a random access port included in the storage means to create stored data, the storage means further including a sequential access port that provides the stored data; and second means, coupled to the first means, for performing video compression on the intra picture, the predicted difference picture, and the bidirectional difference picture to respectively generate a compressed intra picture, a compressed predicted picture, and a compressed bidirectional picture.

17. The apparatus of claim 16, wherein the first means generates a predicted picture and a bidirectional picture by operating individually on macroblocks of the pictures processed by the apparatus.

18. The apparatus of claim 17, further including a motion estimator, coupled to the first means and to the sequential access port of the storage means, that receives a reference macroblock of the predicted picture, a first window of the intra picture, a reference macroblock of the bidirectional picture, a second window of the intra picture, and a window of the predicted picture within the stored data received via the sequential access port of the storage means, the motion estimator providing to the first means a predicted motion vector that is indicative of a macroblock within the first window of the intra picture that is most similar to the reference macroblock of the predicted picture, and a bidirectional motion vector that is indicative of a macroblock within the second window of the intra picture that is most similar to the reference macroblock of the bidirectional picture, the bidirectional motion vector being further indicative of a macroblock within the window of the predicted picture that is most similar to the reference macroblock of the bidirectional picture, the first means using the predicted motion vector to determine the data representing the intra picture that is to be subtracted from the data representing the predicted picture, the first means using the bidirectional motion vector to determine the data representing the predicted picture and the data representing the intra picture that is to form the mathematical combination to be subtracted from the data representing the bidirectional picture.

19. The apparatus of claim 18, further including a coder, coupled to the first and second means, that performs digital data compression on the compressed intra picture, the compressed predicted picture, and the compressed bidirectional picture to provide processed data.

20. The apparatus of claim 19, wherein the digital data compression performed by the coder includes zigzag scanning, run/level coding, and variable length coding.

21. The apparatus of claim 20, wherein the second means is adjustable to adjust an amount of video compression that it performs.

22. The apparatus of claim 21, further including filtering means, coupled to the first means, for low pass filtering the data representing the intra picture and the mathematical combination of data representing the predicted picture and data representing the intra picture to generate filtered data, and for providing the filtered data to the first means.

23. The apparatus of claim 22, further including a microprocessor coupled to the first and second means, wherein the first means receives a picture synchronization signal indicating reception of a picture to be compressed and includes means for providing an interrupt to the microprocessor indicating reception of the picture synchronization signal, and wherein the microprocessor, in response to the interrupt, provides the first and second means with a signal indicative of locations within the storage device that contain data representing macroblocks of the pictures to be processed by the apparatus.

24. The apparatus of claim 23, wherein the microprocessor further provides the first and second means with information identifying each picture as one of the intra picture, the predicted picture, and the bidirectional picture.

25. The apparatus of claim 24, wherein the motion estimator makes a first processing decision to determine whether each of the macroblocks is to be compressed by subtracting a macroblock of another picture and a second processing decision to determine whether the predicted motion vector, the bidirectional motion vector, or a zero vector is to be used by the first means to determine the macroblocks to be subtracted from each of the macroblocks to be compressed, and wherein the motion estimator provides the first means with a signal that indicates a result of the first and second processing decisions.

26. The apparatus of claim 25, wherein the microprocessor is coupled to the motion estimator, the microprocessor providing to the motion estimator criteria by which the motion estimator is to make the first and second processing decisions.

27. The apparatus of claim 26, wherein the apparatus processes the pictures in accordance with one of the H.261 standard and the MPEG standard.

28. The apparatus of claim 16, further including a coder, coupled to the first and second means, that performs digital data compression on the compressed intra picture, the compressed predicted picture, and the compressed bidirectional picture to provide processed data.

29. The apparatus of claim 28, wherein the digital data compression performed by the coder includes zigzag scanning, run/level coding, and variable length coding.

30. The apparatus of claim 29, wherein the second means is adjustable to adjust an amount of video compression that it performs.

31. The apparatus of claim 30, further including filtering means, coupled to the first means, for low pass filtering the data representing the intra picture and the mathematical combination of data representing the predicted picture and data representing the intra picture to generate filtered data, and for providing the filtered data to the first means.

32. The apparatus of claim 31, wherein the apparatus processes the pictures in accordance with one of the H.261 standard and the MPEG standard.

33. The apparatus of claim 16, wherein the apparatus processes the pictures in accordance with one of the H.261 standard and the MPEG standard.

34. The apparatus of claim 16, wherein the second means is adjustable to adjust an amount of video compression that it performs.

35. An apparatus for processing pictures that include macroblocks, the pictures including an intra picture to be processed without reference to any other picture, a predicted picture to be processed with reference to one other picture, and a bidirectional picture to be processed with reference to two other pictures, the apparatus comprising an encoding unit that includes:

a video compression circuit, having an input that receives the intra picture, a predicted difference picture, and a bidirectional difference picture, that compresses the intra picture, the predicted difference picture, and the bidirectional difference picture to respectively generate a compressed intra picture, a compressed predicted difference picture, and a compressed bidirectional difference picture;

a reconstruction circuit, coupled to the video compression circuit, that generates a reconstructed intra picture from the compressed intra picture and that generates a reconstructed predicted picture from the compressed predicted difference picture and the reconstructed intra picture;

a video storage device including a random access port coupled to the reconstruction circuit and a sequential access port, the video storage device storing the reconstructed intra picture and the reconstructed predicted picture from the reconstruction circuit received via the random access port to create stored data and providing the stored data at the sequential access port; and a first subtracter, coupled to the video compression circuit and the reconstruction circuit, that receives the predicted picture, the reconstructed intra picture, the reconstructed predicted picture, and the bidirectional picture, the first subtracter generating the predicted difference picture as a difference between the predicted picture and the reconstructed intra picture, and generating the bidirectional difference picture as a difference between the bidirectional picture and a mathematical combination of the reconstructed intra picture and the reconstructed predicted picture.

36. The apparatus of claim 35, wherein the video compression circuit includes:

a discrete cosine transform circuit, coupled to the first subtracter, that performs a discrete cosine transform on the intra picture, on the predicted difference picture, and on the bidirectional difference picture, to respectively generate a transformed intra picture, a transformed predicted difference picture, and a transformed bidirectional difference picture; and a quantization circuit, coupled to the discrete cosine transform circuit, that quantizes the transformed intra picture, the transformed predicted difference picture, and the transformed bidirectional difference picture, to respectively generate the compressed intra picture, the compressed predicted difference picture, and the compressed bidirectional difference picture.

37. The apparatus of claim 36, wherein the reconstruction circuit includes:

an inverse discrete cosine transform circuit, coupled to the quantization circuit, that performs an inverse discrete cosine transform on the compressed intra picture and the compressed predicted difference picture to respectively generate an inverse transform intra picture and an inverse transform predicted difference picture;

an inverse quantization circuit, coupled to the inverse discrete cosine transform circuit, that performs an inverse quantization on the inverse transform intra picture and on the inverse transform predicted difference picture to respectively generate the reconstructed intra picture and a reconstructed predicted difference picture; and a second subtracter, coupled to the inverse quantization circuit, that generates a difference between the reconstructed intra picture and the reconstructed predicted difference picture and provides the difference as the reconstructed predicted picture.

38. The apparatus of claim 35, wherein the encoding unit operates individually on macroblocks of the pictures processed by the apparatus.

39. The apparatus of claim 38, further including a motion estimator, coupled to the encoding unit and to the sequential access port of the video storage device, that receives a reference macroblock of the predicted picture, a first window of the intra picture, a reference macroblock of the bidirectional picture, a second window of the intra picture, and a window of the predicted picture within the stored data received from the sequential access port of the video storage device, the motion estimator providing to the encoding unit a predicted motion vector that is indicative of a macroblock within the first window of the intra picture that is most similar to the reference macroblock of the predicted picture, and a bidirectional motion vector that is indicative of a macroblock within the second window of the intra picture that is most similar to the reference macroblock of the bidirectional picture, the bidirectional motion vector being further indicative of a macroblock within the window of the predicted picture that is most similar to the reference macroblock of the bidirectional picture, the encoding unit using the predicted motion vector to determine which macroblocks of the reconstructed intra picture are to be used in generating the predicted difference picture, the encoding unit using the bidirectional motion vector to determine which macroblocks of the reconstructed intra picture and the reconstructed predicted picture are to be used in generating the bidirectional difference picture.

40. The apparatus of claim 39, wherein the encoding unit further includes a coder, coupled to the quantization circuit, that performs digital data compression on the compressed intra picture, the compressed predicted picture, and the compressed bidirectional picture.

41. The apparatus of claim 40, wherein the digital data compression performed by the coder includes zigzag scanning, run/level coding, and variable length coding.

42. The apparatus of claim 41, wherein the quantization circuit quantizes the intra picture, the transformed predicted difference picture, and the transformed bidirectional difference picture based on a quantification coefficient that is adjustable, the encoding unit further including a control circuit, coupled to the quantization circuit, that adjusts the quantification coefficient to ensure that the apparatus achieves a desired compression rate for the processed pictures.

43. The apparatus of claim 42, wherein the encoding unit further includes a filter, coupled to the first subtracter, that low pass filters the reconstructed intra picture and the mathematical combination of the reconstructed intra picture and the reconstructed predicted picture to generate filtered data, the encoding unit providing the filtered data to the first subtracter.

44. The apparatus of claim 43, further including a microprocessor coupled to the encoding unit, wherein the encoding unit receives a picture synchronization signal indicating reception of a picture to be compressed and provides an interrupt to the microprocessor indicating reception of the picture synchronization signal, and wherein the microprocessor, in response to the interrupt, provides the encoding unit with a signal indicative of locations within the storage device that contain data representing macroblocks of the pictures to be processed by the apparatus.

45. The apparatus of claim 44, wherein the microprocessor further provides the encoding unit with information identifying each picture as one of the intra picture, the predicted picture, and the bidirectional picture.

46. The apparatus of claim 45, wherein the motion estimator makes a first processing decision to determine whether each of the macroblocks is to be compressed by subtracting a macroblock of another picture and a second processing decision to determine whether the predicted motion vector, the bidirectional motion vector, or a zero vector is to be used by the encoding unit to determine the macroblocks to be subtracted from each of the macroblocks to be compressed, and wherein the motion estimator provides the encoding unit with a signal that indicates a result of the first and second processing decisions.

47. The apparatus of claim 46, wherein the microprocessor is coupled to the motion estimator, the microprocessor providing to the motion estimator criteria by which the motion estimator is to make the first and second processing decisions.

48. The apparatus of claim 47, wherein the apparatus processes the pictures in accordance with one of the H.261 standard and the MPEG standard.

49. The apparatus of claim 35, wherein the encoding unit further includes a coder, coupled to the quantization circuit, that performs digital data compression on the compressed intra picture, the compressed predicted picture, and the compressed bidirectional picture to provide processed data.

50. The apparatus of claim 49, wherein the digital data compression performed by the coder includes zigzag scanning, run/level coding, and variable length coding.

51. The apparatus of claim 50, wherein the quantization circuit quantizes the intra picture, the transformed predicted difference picture, and the transformed bidirectional difference picture based on a quantification coefficient that is adjustable, the encoding unit further including a control circuit, coupled to the quantization circuit, that adjusts the quantification coefficient to ensure that the apparatus achieves a desired compression rate for the processed pictures.

52. The apparatus of claim 51, wherein the encoding unit further includes a filter, coupled to the first subtracter, that low pass filters the reconstructed intra picture and the mathematical combination of the reconstructed intra picture and the reconstructed predicted picture to generate filtered data, the encoding unit providing the filtered data to the first subtracter.

53. The apparatus of claim 52, wherein the apparatus processes the pictures in accordance with one of the H.261 standard and the MPEG standard.

54. The apparatus of claim 35, wherein the apparatus processes the pictures in accordance with one of the H.261 standard and the MPEG standard.

55. The apparatus of claim 35, wherein the quantization circuit quantizes the intra picture, the transformed predicted difference picture, and the transformed bidirectional difference picture based on a quantification coefficient that is adjustable, the encoding unit further including a control circuit, coupled to the quantization circuit, that adjusts the quantification coefficient to ensure that the apparatus achieves a desired compression rate for the processed pictures.

56. A method for compressing a sequence of picture data, comprising the steps of:

encoding a first portion of the sequence of picture data to yield encoded picture data;

reconstructing at least some of the encoded picture data to yield reconstructed data;

storing the reconstructed data through a random access port into a video memory to create stored data;

accessing a portion of the stored data from the video memory via a sequential access port that is distinct from the random access port in an order that is different from the order in which the stored data was stored in the step of storing;

performing motion compensation on the portion of stored data to generate a motion vector; and encoding at least some of the picture data based upon the motion vector.

57. The method of claim 56, further comprising steps of:

accessing a second portion of the stored data via the sequential port of the video memory;

determining that motion compensation is not to be used for a part of the picture data based upon the second portion of the stored data; and encoding the part of the picture data without using motion compensation.

58. The method of claim 56, wherein the step of performing motion compensation includes determining that motion compensation is to be used for the at least some of the picture data.

59. The method of claim 56, further comprising a step of selecting a standard by which the sequence of pictures is to be compressed;

wherein the step of encoding at least some includes encoding in accordance with the selected standard.

60. The method of claim 59, wherein the step of selecting includes selecting from a first video compression standard in which a first type of picture data in the sequence of picture data is compressed without reference to any other picture and a second type of picture data in the sequence of picture data is compressed with reference to one other picture, and a second video compression standard in which a third type of picture data in the sequence of picture data is compressed with reference to two other pictures.

61. The method of claim 56, wherein the step of encoding includes generating a mathematical combination of the at least some of the picture data and the stored data.

62. The method of claim 56, wherein:

the step of storing includes storing the reconstructed data through a random access port of the video memory; and the step of accessing includes accessing the portion of the stored data through a sequential port of the video memory.

63. An apparatus for compressing a sequence of picture data, comprising:

means for encoding a first portion of the sequence of picture data to yield encoded picture data;

means for reconstructing at least some of the encoded picture data to yield reconstructed data;

means for storing the reconstructed data through a random access portion into a video memory to create stored data;

means for accessing a portion of the stored data from the video memory via a sequential access port that is distinct from the random access port in an order that is different from the order in which the stored data was stored in the step of storing;

means for performing motion compensation on the portion of stored data to generate a motion vector; and means for encoding at least some of the picture data based upon the motion vector.

64. The apparatus of claim 63, further comprising:

means for accessing a second portion of the stored data via the sequential port of the video memory;

means for determining that motion compensation is not to be used for a part of the picture data based upon the second portion of the reconstructed data; and means for encoding the part of the picture data without using motion compensation.

65. The apparatus of claim 63, wherein the means for performing motion compensation includes means for determining that motion compensation is to be used for at least some of the picture data.

66. The apparatus of claim 63, further comprising means for selecting a standard by which the sequence of pictures is to be compressed;

wherein the means for encoding at least some includes means for encoding in accordance with the selected standard.

67. The apparatus of claim 66, wherein the means for selecting includes means for selecting from a first video compression standard in which a first type of picture data in the sequence of picture data is compressed without reference to any other picture and a second type of picture data in the sequence of picture data is compressed with reference to one other picture, and a second video compression standard in which a third type of picture data in the sequence of picture data is compressed with reference to two other pictures.

68. The apparatus of claim 63, wherein the means for encoding includes means for generating a mathematical combination of the at least some of the picture data and the stored data.

69. The apparatus of claim 63, means for storing includes means for individually accessing each of a plurality of cells within the video memory.

70. The apparatus of claim 63, wherein:

the means for storing includes means for storing the reconstructed data through a random access port of the video memory; and the means for accessing includes means for accessing the portion of the stored data through a sequential port of the video memory.

71. The apparatus of claim 63, further comprising the video memory.

72. The apparatus of claim 16, wherein the storage means includes a plurality of memory cells having data which are accessible through the sequential access port in an order that is different from an order in which the data is stored through the random access port.

73. The apparatus of claim 35, wherein the video storage device includes a plurality of memory cells having data which are accessible through the sequential access port in an order that is different from an order in which the data is stored through the random access port.

* * * * *